US006649555B2

(12) United States Patent
Dodwell et al.

(10) Patent No.: US 6,649,555 B2
(45) Date of Patent: Nov. 18, 2003

(54) REACTIVATION OF DEACTIVATED SORBENTS

(75) Inventors: Glenn W. Dodwell, Bartlesville, OK (US); Ronald E. Brown, Bartlesville, OK (US); Robert W. Morton, Bartlesville, OK (US); Jason J. Gislason, Bartlesville, OK (US)

(73) Assignee: ConocoPhillips Company, Bartlesville, OK (US)

( * ) Notice: Subject to any disclaimer, the term of this patent is extended or adjusted under 35 U.S.C. 154(b) by 0 days.

(21) Appl. No.: 10/025,344

(22) Filed: Dec. 19, 2001

(65) Prior Publication Data

US 2003/0113250 A1 Jun. 19, 2003

(51) Int. Cl.$^7$ ............................. B01J 38/10; B01J 20/34; B01J 38/12; C01J 45/00; C01J 45/60
(52) U.S. Cl. ...................... 502/53; 208/208 R; 208/209; 208/213; 208/243; 208/244; 208/246; 208/247; 208/299; 208/305; 502/38; 502/400; 502/406; 502/514; 502/517
(58) Field of Search .................... 502/53, 400, 406, 502/514, 517, 38; 208/208 R, 209, 213, 247, 244, 243, 246, 249, 299, 305

(56) References Cited

U.S. PATENT DOCUMENTS

| 4,088,736 | A |  | 5/1978 | Courty et al. ............... 423/230 |
|---|---|---|---|---|
| 4,673,557 | A |  | 6/1987 | Nieskens et al. ............ 423/230 |
| 4,830,733 | A |  | 5/1989 | Nagji et al. .............. 208/208 R |
| 4,830,734 | A |  | 5/1989 | Nagji et al. .............. 208/208 R |
| 4,849,202 | A |  | 7/1989 | Lee ......................... 423/574 R |
| 5,094,996 | A |  | 3/1992 | Kidd .......................... 502/405 |
| 5,102,854 | A |  | 4/1992 | Delzer et al. ................ 502/410 |
| 5,281,445 | A |  | 1/1994 | Khare ......................... 427/445 |
| 5,306,685 | A |  | 4/1994 | Khare ......................... 502/253 |
| 5,358,921 | A |  | 10/1994 | Kidd et al. .................. 502/407 |
| 5,710,083 | A |  | 1/1998 | Khare .......................... 502/25 |
| 6,184,176 | B1 | * | 2/2001 | Khare ......................... 502/407 |
| 6,254,766 | B1 | * | 7/2001 | Sughrue et al. ............. 208/244 |
| 6,274,533 | B1 | * | 8/2001 | Khare ......................... 502/343 |
| 6,338,794 | B1 | * | 1/2002 | Khare ......................... 208/247 |
| 6,429,170 | B1 | * | 8/2002 | Dodwell ..................... 502/400 |

FOREIGN PATENT DOCUMENTS

EP         0553796 A1  *  8/1993  ............ B01J/20/56

* cited by examiner

Primary Examiner—Stanley S. Silverman
Assistant Examiner—Jonas N. Strickland
(74) Attorney, Agent, or Firm—Lynda S. Jolly

(57) ABSTRACT

A deactivated sorbent composition is reactivated by contacting the deactivated sorbent with a reducing stream under activation conditions sufficient to reduce the amount of sulfates associated with the sorbent composition.

42 Claims, No Drawings

REACTIVATION OF DEACTIVATED SORBENTS

BACKGROUND OF THE INVENTION

This invention relates to the removal of sulfur from sulfur-containing fluid streams such as cracked-gasolines and diesel fuels. In another aspect, this invention relates to the reactivation of a sorbent composition which has become deactivated by sulfation.

Hydrocarbon-containing fluids such as gasoline and diesel fuels typically contain a quantity of sulfur. High levels of sulfur in such automotive fuels is undesirable because oxides of sulfur present in automotive exhaust may irreversibly poison noble metal catalysts employed in automobile catalytic converters. Emissions from such poisoned catalytic converters may contain high levels of non-combusted hydrocarbons, oxides of nitrogen, and/or carbon monoxide, which, when catalyzed by sunlight, form ground level ozone, more commonly referred to as smog.

Much of the sulfur present in the final blend of most gasolines originates from a gasoline blending component commonly known as "cracked-gasoline." Thus, reduction of sulfur levels in cracked-gasoline will inherently serve to reduce sulfur levels in most gasolines, such as, automobile gasolines, racing gasolines, aviation gasolines, boat gasolines, and the like.

Many conventional processes exist for removing sulfur from cracked-gasoline. However, most conventional sulfur removal processes, such as hydrodesulfurization, tend to saturate olefins and aromatics in the cracked-gasoline and thereby reduced its octane number (both research and motor octane number). Thus, there is a need for a process wherein desulfurization of cracked-gasoline is achieved while the octane number is maintained.

In addition to the need for removing sulfur from cracked-gasoline, there is also a need to reduce sulfur content in diesel fuel. In removing sulfur from diesel fuel by conventional hydrodesulfurization, the cetane is improved but there is a large cost in hydrogen consumption. Such hydrogen is consumed by both hydrodesulfurization and aromatic hydrogenation reactions. Thus, there is a need for a process wherein desulfurization of diesel fuel is achieved without significant consumption of hydrogen so as to provide a more economical desulfurization process.

To satisfy such needs, there has been developed a process for desulfurizing cracked-gasolines or diesel fuels wherein a sorbent comprising zinc oxide is contacted with the sulfur-containing fluid stream under conditions sufficient to remove at least a portion of the sulfur from the fluid stream and provide a sulfurized sorbent comprising zinc sulfide. The sulfurized sorbent is thereafter contacted with an oxygen-containing regeneration stream under conditions sufficient to convert at least a portion of the zinc sulfide to zinc oxide, thereby providing a regenerated sorbent. The regenerated sorbent can then be contacted with a reducing stream to provide an activated sorbent. Thereafter, the activated sorbent can, once again, be contacted with the sulfur-containing fluid stream.

During such a hydrocarbon desulfurization process, wherein a zinc oxide-containing sorbent is employed, certain conditions can cause sulfates to form on/in the sorbent composition. Such sulfation of the sorbent is undesirable for a number of reasons. For example, the presence of excess sulfates on/in the sorbent reduces the sulfur-loading capabilities of the sorbent and thereby effectively deactivates the sorbent. Further, once an excessive amount of sulfates has formed on/in the sorbent, it can be difficult to remove the sulfates from the sorbent under conventional regeneration and activation conditions.

SUMMARY OF THE INVENTION

Accordingly, it is an object of the present invention to provide an improved process for activating a sorbent composition which has become deactivated due to sulfation.

Another object of the present invention is to provide a desulfurization process which extends the useful life of a sorbent composition by employing a unique process for removing sulfates from the sorbent.

It should be noted that the above-listed objects need not all be accomplished by the invention claimed herein and other objects and advantages of the invention will be apparent from the following description of the invention and the appended claims.

In one aspect of the invention, a sorbent activation process is provided. The activation process comprises contacting a deactivated sorbent comprising a promoter metal and at least about 2 weight percent sulfur as sulfates with a hydrogen-containing stream in an activation zone under activation conditions sufficient to reduce the valence of the promoter metal and reduce the amount of sulfates associated with the deactivated sorbent.

In accordance with another aspect of the present invention, there is provided a sorbent activation process comprising the steps of: (a) contacting a sulfurized sorbent comprising zinc sulfide and sulfates with an oxygen-containing stream in a regeneration zone under regeneration conditions sufficient to convert at least a portion of the zinc sulfide to zinc oxide, thereby providing an at least partially regenerated sorbent; (b) contacting at least a portion of the at least partially regenerated sorbent with a reducing stream in an activation zone under activation conditions sufficient to reduce the amount of sulfates associated with the at least partially regenerated sorbent, thereby providing an at least partially activated sorbent; (c) returning at least a portion of the at least partially activated sorbent to the regeneration zone for contacting with the oxygen-containing stream, thereby providing a further regenerated sorbent; and (d) returning at least a portion of the further regenerated sorbent to the activation zone for contacting with the reducing stream, thereby providing a further activated sorbent.

In accordance with a further aspect of the present invention, there is provided a sorbent activation process comprising contacting a deactivated sorbent comprising a promoter metal and at least about 2 weight percent sulfur as sulfates with a hydrogen-containing stream in an activation zone under activation conditions sufficient to reduce the valence of the promoter metal and reduce the amount of sulfates associated with the deactivated sorbent, thereby providing an activated sorbent. The activation conditions include an extended activation residence time of more than about 1 hour.

In accordance with a still further aspect of the present invention, there is provided a desulfurization process comprising the steps of: (a) deactivating a sorbent comprising a promoter metal and zinc oxide, thereby providing a deactivated sorbent comprising sulfates; (b) contacting at least a portion of the deactivated sorbent with a hydrogen-containing stream in an activation zone under activation conditions sufficient to reduce the amount of sulfates associated with the deactivated sorbent, thereby providing a reactivated sorbent; and (c) contacting at least a portion of the reactivated sorbent with a sulfur-containing fluid in a reaction zone under reaction conditions sufficient to remove at least a portion of the sulfur from the sulfur-containing fluid, thereby providing a desulfurized fluid and a sulfurized sorbent.

DETAILED DESCRIPTION OF THE PREFERRED EMBODIMENTS

In accordance with one embodiment of the present invention, a novel process is provided for desulfurizing a sulfur-containing fluid by contacting the sulfur-containing fluid with a sorbent comprising a promoter metal and zinc oxide, and thereafter regenerating and activating or re-activating the sorbent.

The sulfur-containing fluid employed in the process of the present invention is preferably a hydrocarbon-containing fluid comprising a quantity of sulfur compounds therein. Preferably, such hydrocarbon-containing fluid can be used as a fuel or can be a precursor to fuel. Examples of suitable hydrocarbon-containing fluids include cracked-gasoline, diesel fuels, jet fuels, straight run naphtha, straight run distillates, coker gas oil, coker naphtha, alkylates, crude oil, light cycle oil, and straight run gas oil. Most preferably, the sulfur-containing fluid comprises a hydrocarbon-containing fluid selected from the group consisting of gasoline, cracked-gasoline, diesel fuel, and mixtures thereof.

As used herein, the term "gasoline" denotes a mixture of hydrocarbons boiling in a range of from about 100° F. to about 500° F., or any fraction thereof. Examples of suitable gasolines include, but are not limited to, hydrocarbon streams in refineries such as naphtha, straight-nun naphtha, coker naphtha, catalytic gasoline, visbreaker naphtha, alkylate, isomerate, reformate, and the like, and mixtures thereof.

As used herein, the term "cracked-gasoline" denotes a mixture of hydrocarbons boiling in a range of from about 100° F. to about 500° F., or any fraction thereof, that are products of either thermal or catalytic processes that crack larger hydrocarbon molecules into smaller molecules. Examples of suitable thermal processes include, but are not limited to, coking, thermal cracking, visbreaking, and the like, and combinations thereof. Examples of suitable catalytic cracking processes include, but are not limited to, fluid catalytic cracking, heavy oil cracking, and the like, and combinations thereof. Thus, examples of suitable cracked-gasolines include, but are not limited to, coker gasoline, thermally cracked gasoline, visbreaker gasoline, fluid catalytically cracked gasoline, heavy oil cracked-gasoline, and the like, and combinations thereof. In some instances, the cracked-gasoline may be fractionated and/or hydrotreated prior to desulfurization when used as the sulfur-containing fluid in the process in the present invention.

As used herein, the term "diesel fuel" denotes a mixture of hydrocarbons boiling in a range of from about 300° F. to about 750° F., or any fraction thereof. Examples of suitable diesel fuels include, but are not limited to, light cycle oil, kerosene, jet fuel, straight-run diesel, hydrotreated diesel, and the like, and combinations thereof.

The sulfur-containing fluid described herein as suitable feed in the desulfurization process of the present invention comprises a quantity of olefins, aromatics and sulfur, as well as paraffins and napthenes. The amount of olefins in gaseous cracked-gasoline is generally in a range of from about 10 to about 35 weight percent olefins based on the total weight of the gaseous cracked-gasoline. For diesel fuel there is essentially no olefin content. The amount of aromatics in gaseous cracked-gasoline is generally in a range of from about 20 to about 40 weight percent aromatics based on the total weight of the gaseous cracked-gasoline. The amount of aromatics in gaseous diesel fuel is generally in a range of from about 10 to about 90 weight percent aromatics based on the total weight of a gaseous diesel fuel. The amount of atomic sulfur in the sulfur-containing fluid, preferably cracked-gasoline or diesel fuel, suitable for use in the desulfurization process of the present invention is generally greater than about 50 parts per million by weight (ppmw) of the sulfur-containing fluid, more preferably in a range of from about 100 ppmw atomic sulfur to about 10,000 ppmw atomic sulfur, and most preferably from 150 ppmw atomic sulfur to 2,000 ppmw atomic sulfur. It is preferred for at least about 50 weight percent of the atomic sulfur present in the sulfur-containing fluid employed in the present invention to be in the form of organosulfur compounds. More preferably, at least about 75 weight percent of the atomic sulfur present in the sulfur-containing fluid is in the form of organosulfur compounds, and most preferably at least 90 weight percent of the atomic sulfur is in the form of organosulfur compounds. As used herein, "sulfur" used in conjunction with "ppmw sulfur" or the term "atomic sulfur", denotes the amount of atomic sulfur (about 32 atomic mass units) in the sulfur-containing fluid, not the atomic mass, or weight, of a sulfur compound, such as an organo-sulfur compound.

As used herein, the term "sulfur" denotes sulfur in any form normally present in a sulfur-containing fluid such as cracked-gasoline or diesel fuel. Examples of such sulfur which can be removed from a sulfur-containing fluid through the practice of the present invention include, but are not limited to, hydrogen sulfide, carbonyl sulfide (COS), carbon disulfide ($CS_2$), mercaptans (RSH), organic sulfides (R—S—R), organic disulfide (R—S—S—R), thiophenes, substituted thiophenes, organic trisulfides, organic tetrasulfides, benzothiophene, alkyl thiophenes, alkyl benzothiophenes, alkyl dibenzothiophenes, and the like, and combinations thereof as well as heavier molecular weights of the same which are normally present in sulfur-containing fluids of the types contemplated for use in the desulfurization process of the present invention, wherein each R can be an alkyl, cycloaklyl, or aryl group containing 1 to 10 carbon atoms.

As used herein, the term "fluid" denotes gas, liquid, vapor, and combinations thereof.

As used herein, the term "gaseous" denotes the state in which the sulfur-containing fluid, such as cracked-gasoline or diesel fuel, is primarily in a gas or vapor phase.

The sorbent composition with which the sulfur-containing fluid is contacted in order to desulfurize the sulfur-containing fluid generally comprises a promoter metal and zinc oxide. The sorbent composition employed in the present invention can be prepared in accordance with the sorbent preparation method disclosed in U.S. Pat. Nos. 6,274,533, 6,254,766, and 6,184,176 the disclosures of which are incorporated herein by reference.

As used herein with reference to the sorbent composition, the term "metal" denotes metal in any form such as elemental metal, a metal oxide, or a metal oxide precursor. The promoter metal of the sorbent composition is preferably selected from the group consisting of nickel, cobalt, iron, manganese, tungsten, silver, gold, copper, platinum, zinc, tin, ruthenium, molybdenum, antimony, vanadium, iridium, chromium, palladium, rhodium, oxides thereof, precursors to oxides thereof, and combinations thereof. Most preferably, the promoter metal is selected from the group consisting of nickel, nickel oxide, nickel oxide precursors, and combinations thereof. The promoter metal will generally be present in the sorbent composition in an amount in a range of from about 1 to about 60 weight percent promoter metal based on the total weight of the sorbent composition, preferably an amount in a range of from about 5 to about 50 weight percent promoter metal, most preferably in an amount in a range of from 10 to 40 weight percent promoter metal.

Usually, the promoter metal in the common oxidation state of the promoter metal is combined with the zinc oxide portion of the sorbent composition. Alternatively, the promoter metal, or even the entire sorbent composition, can be oxidized after sulfur removal to bring the promoter metal back to the common oxidized state. Prior to use as a sorbent, the number of oxygen atoms associated with the promoter metal must be reduced to form a reduced-valence promoter metal. Consequently, prior to sulfur removal, at least a portion of the promoter metal present in the sorbent composition must be present as a reduced-valence promoter metal. While not wishing to be bound by theory, it is believed that this reduced-valence promoter metal can chemisorb, cleave, or remove sulfur. Thus, either the number of oxygen atoms associated with the promoter metal is reduced or the oxidation state of the promoter metal is a zero-valent metal. For example, if nickel is the promoter metal, nickel oxide (NiO) can be used and the reduced-valence nickel (promoter metal) can be either nickel metal (Ni$^0$) or a non-stoichiometric nickel oxide having a formula of NiO$_{(1-x)}$ wherein $0<x<1$. If tungsten is the promoter metal, tungsten oxide (WO$_3$) can be used and the reduced-valence tungsten (promoter metal) can be either tungsten oxide (WO$_2$), tungsten metal (W$^0$), or a non-stoichiometric tungsten oxide having a formula of WO$_{(3-y)}$ wherein $0<y<3$.

Of the total quantity of the promoter metal present in the sorbent composition, it is preferred that at least about 10 weight percent of the promoter metal to be present in the form of a reduced-valence promoter metal, i.e., either a zero-valent metal or a non-stoichiometric metal oxide, as described above. More preferably at least about 40 weight percent of the promoter metal is a reduced-valence promoter metal, and most preferably at least 80 weight percent of the promoter metal is a reduced-valence promoter metal for best sorbent activity and sulfur removal. The reduced-valence promoter metal will generally be present in the sorbent composition of the present invention in an amount in a range of from about 0.5 to about 50 weight percent reduced-valence promoter metal based on the total weight of the sorbent composition, preferably in an amount in a range of from about 4 to about 40 weight percent reduced-valence promoter metal, and most preferably in an amount in a range of from 8 to 35 weight percent reduced-valence promoter metal for best sorbent activity and sulfur removal.

The zinc oxide component of the sorbent composition employed in the desulfurization process of the present invention can be in the form of zinc oxide, such as a dispersion of small crystallites of, or powdered, zinc oxide, or in the form of one or more zinc compounds that are convertible to zinc oxide. Examples of suitable zinc compounds that are convertible to zinc oxide include, but are not limited to, zinc sulfide, zinc sulfate, zinc hydroxide, zinc carbonate, zinc acetate, zinc nitrate, and combinations thereof. Preferably, the zinc oxide is present in the form of small crystallites of zinc oxide for best sorbent activity and sulfur removal. Zinc oxide will generally be present in the sorbent composition of the present invention in an amount in a range of from about 10 to about 90 weight percent zinc oxide based on the total weight of the sorbent composition, preferably in an amount in a range of from about 15 to about 60 weight percent zinc oxide, and most preferably in an amount in a range of from 20 to 55 weight percent zinc oxide for best sorbent activity and sulfur removal.

When the sorbent composition is exposed to high temperatures (e.g., during calcination), it is preferred for at least a portion of the zinc oxide and the promoter metal to form a substitutional solid solution having the general formula: $M_XZn_YO$, wherein M is the promoter metal, X is a numerical value in a range of from about 0.5 to about 0.99, and Y is a numerical value in a range of from about 0.01 to about 0.5. Such substitutional solid solution will generally be present in an amount in a range of from about 5 to about 60 percent by weight of the sorbent composition, most preferably from 20 to 40 weight percent. When the sorbent composition comprising the substitutional solid solution is reduced (i.e., activated), it is preferred for at least a portion of the substitutional solid solution to be converted to a reduced metal solid solution having the general formula: $M_AZn_B$, wherein M is the promoter metal, A is the numerical value in a range of from about 0.7 to about 0.99, and B is a numerical value in a range of from about 0.01 to about 0.3. Such reduced metal solution will generally be present in an amount in a range of from about 5 to about 70 percent by weight of the sorbent composition, most preferably from 25 to 45 weight percent.

Preferably, the sorbent composition employed in the inventive desulfurization process further comprises a refractory metal oxide such as, for example, silica, alumina, silica-alumina, aluminate, and/or silica-aluminate. The refractory metal oxide such as, for example, silica, alumina, silica-alumina, aluminate, and/or silica-aluminate can enhance the porosity of the resulting composition such that the sites of the sorbent can be exposed to the reacting mixture. Further, the refractory metal oxide can enhance the porosity of the sorbent so that only a minimum of zinc oxide is necessary in the sorbent composition.

Any suitable source of silica may be employed in the sorbent composition such as, for example, diatomite, expanded perlite, silicalite, silica colloid, flame-hydrolized silica, silica gel, precipitated silica, and the like, and combinations thereof. In addition, silicon compounds that are convertible to silica such as silicic acid, ammonium silicate, and the like, and combinations thereof can also be employed. Preferably, the silica source is diatomite or expanded perlite for best sorbent activity and sulfur removal. When the sorbent comprises silica, the silica will generally be present in the sorbent composition in an amount in a range of from about 5 to about 85 weight percent silica based on the total weight of the sorbent composition, preferably in an amount in a range of from about 10 to about 60 weight percent silica, and most preferably in an amount in a range of from 15 to 55 weight percent silica for best sorbent activity and sulfur removal. Generally, perlite comprises silicon dioxide, aluminum oxide, potassium oxide, sodium oxide, calcium oxide, plus trace elements.

The alumina employed in the preparation of the sorbent composition can be any suitable commercially available alumina material such as, for example, colloidal alumina solutions, hydrated aluminas, peptized aluminas, and, generally, those alumina compounds produced by the dehydration of alumina hydrates. The preferred alumina is hydrated alumina such as, for example, bohemite or pseudobohemite for best sorbent activity and sulfur removal. When the sorbent comprises alumina, the alumina will generally be present in the sorbent composition in an amount in a range of from about 1 to about 30 weight percent alumina based on the total weight of the sorbent composition, preferably in an amount in a range of from about 5 to about 20 weight percent alumina, and most preferably in an amount in a range of from 8 to 15 weight percent alumina for best sorbent activity and sulfur removal. When the sorbent composition is exposed to high temperatures (e.g., during calcination) at least a portion, preferably a substantial portion of the alumina is converted to an aluminate, most preferably a zinc aluminate and/or a nickel-zinc aluminate. Preferably, the sorbent composition comprises from about 2 to about 30 weight percent nickel-zinc aluminate, most preferably from 8 to 25 weight percent nickel-zinc aluminate.

The sorbent composition can additionally comprise a binder. The binder can be any suitable compound that has cement-like, or adhesion, properties which can help to bind the components of the sorbent composition together. Suitable examples of binders include, but are not limited to, cements such as, for example, gypsum plaster, common lime, hydraulic lime, natural cements, portland cement, and high alumina cement, and the like, and combinations thereof. A particularly preferred binder is calcium aluminate. When a binder is present, the amount of binder in the sorbent composition is generally in a range of from about 0.1 to about 50 weight percent binder based on the total weight of the sorbent composition. Preferably, the amount of the binder in the sorbent composition is in a range of from about 1 to about 40 weight percent, and most preferably in a range of from 5 to 30 weight percent for best binding results.

The sorbent composition employed in the inventive desulfurization process preferably is in the form of a particulate, most preferably a microsphere, having a mean particle size in a range of from about 1 micrometer (micron) to about 500 micrometers, more preferably in a range of from about 10 micrometers to about 300 micrometers. As used herein, the term "mean particle size" refers to the size of the particulate material comprising the sorbent as determined by using a RO-TAP Testing Sieve-Shaker, manufactured by W. S. Tyler, Inc. of Mentor, Ohio, or other comparable sieves. To determine mean particle size, the material to be measured is placed in the top of a nest of standard 8 inch diameter stainless steel framed sieves with a pan on the bottom. The material undergoes sifting for a period of about 10 minutes; thereafter, the material retained on each sieve is weighed. The percent retained on each sieve is calculated by dividing the weight of the material retained on a particular sieve by the weight of the original sample. This information is used to compute the mean particle size, by the method outlined in Chapter 3 of *Fluidization Engineering* by Kunii and Levenspiel (1987).

The desulfurization process of the present invention is carried out in a desulfurization zone of a reactor under a set of desulfurization conditions that include total pressure, temperature, weighted hourly space velocity, and diluent flow rate.

The desulfurization conditions at which the desulfurization zone is maintained preferably include a temperature in a range of from about 200° F. to about 1200° F., more preferably from about 500° F. to about 900° F., and most preferably from 600° F. to 800° F. for best sulfur removal.

The total pressure at which the desulfurization zone is maintained is preferably in a range of from about 15 pounds per square inch gauge (psig) to about 1500 psig, more preferably from about 50 psig to about 600 psig, and most preferably from 100 psig to 200 psig for best sulfur removal and minimal octane loss.

As used herein, the term "weighted hourly space velocity" or "WHSV" is defined as the numerical ratio of the rate at which the sulfur-containing fluid is charged to the desulfurization zone in pounds per hour at standard conditions of temperature and pressure (STP) divided by the pounds of the sorbent composition contained in the desulfurization zone to which the sulfur-containing fluid is charged. In the practice of the present invention, such WHSV should be in a range of from about 0.5 $hr^{-1}$ to about 50 $hr^{-1}$, preferably in a range of from about 1 $hr^{-1}$ to about 20 $hr^{-1}$. Desulfurization of the sulfur-containing fluid in the desulfurization zone should be conducted for a time sufficient to effect the removal of at least a substantial portion of the sulfur from such sulfur-containing fluid.

In desulfurizing the sulfur-containing fluid, additional reactants, either alone ir in a diluent, can be employed which interferes with any possible chemical or physical reacting of the olefinic and aromatic compounds in the sulfur-containing fluid. Preferably, such diluents comprise hydrogen. The diluent charged to the reaction zone preferably contains more than about 25 volume percent hydrogen based on the total volume of the diluent, more preferably more than about 50 volume percent hydrogen, still more preferably more than about 75 volume percent hydrogen, and most preferably more than 95 volume percent hydrogen. If desired, the diluent can further comprise compounds such as methane, carbon dioxide, flue gas, nitrogen, and the like, and combinations thereof. Thus, it is not essential to the practice of the present invention that a high purity hydrogen be employed in achieving the desired desulfurization of the sulfur-containing fluid. The amount of hydrogen charged to the desulfurization zone is generally such that the mole ratio of hydrogen to sulfur-containing fluid is in a range of from about 0.01:1 to about 100:1, more preferably from about 0.1:1 to about 10:1, and most preferably from 0.5:1 to 2:1 for best sulfur removal.

Preferably, the desulfurization conditions employed in the desulfurization process of the present invention are sufficient to provide vaporization of substantially all of the sulfur-containing fluid present in the desulfurization zone. Preferably, at least about 75 weight percent of the sulfur-containing fluid present in the desulfurization zone is in the vapor phase, more preferably at least about 95 weight percent of the sulfur-containing fluid is in the vapor phase, and most preferably at least 98 weight percent of the sulfur-containing fluid is in the vapor phase for best sulfur removal.

It is presently preferred that the desulfurization reaction of the present invention be carried out in the reaction zone of a fluidized bed reactor. As used herein, the term "fluidized bed reactor" denotes a reactor wherein a fluid feed, as defined earlier, can be contacted with solid particles (such as sorbent particles) in a manner such that the solid particles are at least partly suspended within the reaction zone by the flow of the fluid feed through the reaction zone and the solid particles are substantially free to move about within the reaction zone as driven by the flow of the fluid feed through the reaction zone.

When the sorbent composition is contacted with the sulfur-containing fluid in the desulfurization zone, sulfur compounds, particularly organosulfur compounds, present in the sulfur-containing fluid are removed from such fluid. At least a portion of the sulfur removed from the sulfur-containing fluid is employed to convert at least a portion of the zinc oxide of the sorbent composition into zinc sulfide. While not wishing to be bound by theory, it is believed that the promoter metal of the sorbent composition functions to facilitate removal of the sulfur from the sulfur-containing fluid while the zinc oxide functions to facilitate the storage of the sulfur on/in the sorbent composition through conversion of at least a portion of the zinc oxide to zinc sulfide.

In contrast to many conventional sulfur removal processes (e.g., hydrodesulfurization), it is preferred that substantially none of the sulfur removed from the sulfur-containing fluid is converted to hydrogen sulfide. Rather, it is preferred that the fluid effluent (comprising the desulfurized fluid and the diluent) from the desulfurization zone comprises not more than about 200 percent (by weight) of the amount of hydrogen sulfide in the fluid feed (comprising the sulfur-containing fluid and the diluent) charged to the desulfurization zone, more preferably not more than about 150 percent of the amount of hydrogen sulfide in the fluid feed, and most preferably less hydrogen sulfide than the fluid feed.

The fluid effluent from the desulfurization zone preferably contains less than about 50 weight percent of the amount of sulfur in the fluid feed charged to the desulfurization zone, more preferably less than about 20 weight percent of the amount of sulfur in the fluid feed, and most preferably less than 5 weight percent of the amount of sulfur in the fluid feed. It is preferred for the total sulfur content of the fluid effluent from the desulfurization zone to be less than about 50 parts per million by weight (ppmw) of the total fluid effluent, more preferably less than about 30 ppmw, still more preferably less than about 15 ppmw, and most preferably less than 10 ppmw.

After sulfur removal in the desulfurization zone, the fluids in the reaction zone and the solids in the reaction zone can then be separated by any manner or method known in the art for separating a solid from a fluid, preferably a solid from a gas. Examples of suitable separating means for separating solids and gasses include, but are not limited to, cyclonic devices, settling chambers, impingement devices, filters, and combinations thereof. The desulfurized fluid, preferably desulfurized cracked-gasoline or diesel fuel, can thereafter be recovered from the fluid effluent and preferably liquified. Liquification of such desulfurized fluid can be accomplished by any method or manner known in the art. The liquified, desulfurized fluid preferably comprises less than about 50 weight percent of the amount of sulfur in the sulfur-containing fluid charged to the desulfurization zone, more preferably less than about 20 weight percent of the amount of sulfur in the sulfur-containing feed, and most preferably less than 5 weight percent of the amount of sulfur in the sulfur-containing fluid. The desulfurized fluid preferably comprises less than about 50 ppmw sulfur, more preferably less than about 30 ppmw sulfur, still more preferably less than about 15 ppmw sulfur, and most preferably less than 10 ppmw sulfur.

After separation of the sulfurized sorbent from the fluid effluent of the reactor, the sulfurized sorbent is preferably regenerated in a regeneration zone by contacting the sulfurized sorbent composition with an oxygen-containing regeneration stream under suitable regeneration conditions. The regeneration is preferably carried out at a temperature in a range of from about 200° F. to about 1500° F., more preferably from about 500° F. to about 1200° F., and most preferably from 800° F. to 1000° F. The total pressure in the regeneration zone is preferably maintained in a range of from about 10 psig to about 1500 psig, more preferably in a range of from 15 to 100 psig. The residence time of the sorbent composition in the regeneration zone can be any time sufficient to achieve the desired level of sorbent regeneration. Such regeneration residence time is preferably in a range of from about 0.1 hours to about 24 hours, more preferably from 0.5 hours to 3 hours. These parameters provide for best sorbent regeneration.

During regeneration, a substantial portion of the promoter metal may be returned to its common oxidized (i.e., unreduced) state. The oxygen-containing stream employed in the regeneration step can be any oxygen-containing stream that, when contacted with the sulfurized sorbent composition under the above-described regeneration conditions, promotes the conversion of at least a portion of the zinc sulfide associated with the sulfurized sorbent to zinc oxide, as well as burns off any remaining hydrocarbon deposits that might be present on the sulfurized sorbent composition. The oxygen-containing compound employed in the regeneration step can be pure oxygen or any oxygen-containing gas(es) such as air.

After regeneration, the desulfurized sorbent composition is subjected to reduction (i.e., activation) in an activation zone under activation conditions with a reducing stream, preferably a hydrogen-containing reducing stream, so that at least a portion of the unreduced promoter metal of the regenerated sorbent composition is reduced, thereby providing a reduced sorbent composition comprising a reduced-valence promoter metal. Such reduced-valence promoter metal is present in the sorbent composition in an amount that provides for the removal of sulfur from a sulfur-containing fluid according to the process of the present invention. Typical activation conditions at which the activation zone is maintained include a temperature in a range of from about 100° F. to about 1500° F., more preferably from about 300° to about 950° F., and most preferably in a range from 600° to 800° F. The activation zone is preferably maintained at a pressure in a range from about 10 psig to about 1500 psig, more preferably from 15 psig to 100 psig. The residence time of the sorbent in the activation zone is preferably in a range of from about 0.1 hours to about 40 hours, more preferably from about 0.2 hours to about 10 hours, and most preferably from 0.5 hours to 1 hour. The reducing stream with which the regenerated sorbent is contacted in the activation zone preferably contains at least about 25 volume percent hydrogen, more preferably at least about 50 volume percent hydrogen, still more preferably at least about 90 volume percent hydrogen, and most preferably at least 95 volume percent hydrogen. Thus, it is not essential to the practice of the present invention that a high purity hydrogen be employed in achieving the desired reduction (i.e., activation) of the sorbent composition. Conditions recited in this paragraph provide for best activation of the desulfurized sorbent.

In addition to reducing the valence of the promoter metal, the reduction step is preferably sufficient to reduce the amount of sulfates associated with the sorbent composition. As used herein, the term "sulfate" or "sulfates" shall denote any sulfate-containing compound(s) whose chemical formula includes the expression "$SO_4$". Typically, the sulfates associated with the sorbent composition employed in the present invention will be in the form of a zinc sulfate or a zinc oxysulfate. One example of a particularly common sulfate associated with the sorbent composition is trizinc oxide bisulfate ($Zn_3O(SO_4)_2$).

The sulfates associated with the sorbent composition are primarily formed in the regeneration zone when the optimum regeneration conditions are not properly maintained and/or when the regeneration stream contains undesirable impurities. Excess sulfation of the sorbent composition can dramatically decrease the ability of the sorbent composition to remove sulfur from the sulfur-containing fluid in the desulfurization zone. When the amount of sulfates associated with the sorbent composition is excessively high, the sorbent composition is effectively deactivated. As used herein, the term "deactivated sorbent" shall denote a sorbent comprising sulfates in an amount which causes the sorbent to remove less than half the amount (by weight) of sulfur from a sulfur-containing fluid, such as cracked-gasoline or diesel fuel, than if such sorbent comprised substantially no sulfates. Typically, a deactivated sorbent will comprise at least about 2 weight percent sulfur in the form of sulfates. More typically, the deactivated sorbent will comprise more than about 4 weight percent sulfur as sulfates, still more typically the deactivated sorbent will comprise at least about 8 weight percent sulfur as sulfates, and most typically the deactivated sorbent will comprise at least 12 weight percent sulfur as sulfates.

The process of the present invention is preferably effective to reactivate a deactivated sorbent. As used herein, the term "activated sorbent" or "reactivated sorbent" shall denote a sorbent composition capable of removing at least 50 weight percent as much sulfur from a sulfur-containing fluid, such as cracked-gasoline or diesel fuel, as a sorbent composition which comprises substantially no sulfates. Preferably, the reactivated sorbent comprises less than about 2.0 weight percent sulfur as sulfates, more preferably less than about 1.0 weight percent sulfur as sulfates, still more preferably less than about 0.75 weight percent sulfur as sulfates, and most preferably less than 0.5 weight percent sulfur as sulfates.

It has been discovered that the presence of the promoter metal in the sorbent composition facilitates a reduction in the amount of sulfates associated with the sorbent composition when the sulfated sorbent composition is contacted with the reducing stream in the activation zone. Thus, the amount of sulfates removed from a sorbent in the activation zone when the sorbent comprises the promoter metal is more than the amount of sulfates removed from the sorbent composition when the sorbent comprises substantially no promoter metal. Preferably, when the sorbent comprises the promoter metal, at least about a 2 percent increase in sulfate removal (by weight of sulfur as sulfates) is exhibited over a sorbent comprising substantially no promoter metal, more preferably at least about a 5 percent increase in sulfate removal is exhibited, still more preferably at least about a 10 percent increase in sulfate removal is exhibited, and most preferably at least a 50 percent increase in sulfate removal is exhibited over a sorbent comprising substantially no promoter metal.

It has further been discovered that a deactivated sorbent can be transformed into a reactivated sorbent by repeatedly regenerating and activating the sorbent without contacting the sorbent with the sulfur-containing fluid between activation and repeated regeneration. Not wishing to be bound by theory, it is believed that in the activation zone the promoter metal facilitates the conversion of at least a portion of the zinc sulfates or zinc oxysulfates formed in the regeneration zone to zinc sulfide. Thus, although the amount of sulfates associated with the sorbent may be reduced in the activation zone, the fact that a substantial amount of zinc sulfide is still present on/in the sorbent means that the sorbent is only partially activated and will not achieve its optimum sulfur removing capabilities. By reintroducing the partially activated sorbent into the regeneration zone after activation, a substantial portion of the zinc sulfide remaining on/in the partially activated sorbent can be converted to zinc oxide. After reintroduction of the partially activated sorbent into the regeneration zone, the further regenerated sorbent can then be reintroduced into the activation zone. In the activation zone, the valence of the metal promoter is once again reduced and the amount of sulfates associated with the further regenerated sorbent can be further reduced.

The above-described inventive reactivation process, involving the repeated regeneration and activation of the sorbent composition, can provide an increased sulfate removal (by weight of sulfur as sulfates) of at least about 2 percent over single-pass regeneration and activation (i.e., if only single regeneration and activation were performed prior to reintroducing the sorbent into the desulfurization zone), preferably at least about a 5 percent increase in sulfate removal is experienced with repeated regeneration and activation, still more preferably at least about a 10 percent increase in sulfate removal is experienced with repeated regeneration and activation, and most preferably at least a 25 percent increase in sulfate removal is experienced with repeated regeneration and activation. The number of times the regeneration and activation steps can be repeated prior to reintroducing the sorbent composition into the desulfurization zone can be any number of repetitions sufficient to provide a reactivated sorbent having an amount of sulfates below the deactivating amount. Typically, adequate reactivation of the sorbent can be accomplished by repeating the regeneration and activation steps 1 to 3 times.

It has also been discovered that a deactivated sorbent can be reactivated with or without repeating the regeneration and activation steps by employing an extended activation residence time. Under conventional activation conditions, the typical residence time of the sorbent in the activation zone is less than one hour. When employing the extended activation residence time of the present invention, it is preferred for the residence time of the sorbent in the activation zone to be at least about 1 hour, more preferably at least about 2 hours, still more preferably at least about 5 hours, yet still more preferably at least 8 hours, and most preferably between 8 and 20 hours.

Once the deactivated sorbent has been reactivated in accordance with the process of the present invention, at least a portion of the reactivated sorbent can be returned to the desulfurization zone for further desulfurization of the sulfur-containing fluid.

When carrying out the process of the present invention, the steps of desulfurizing, regenerating, and activating can be accomplished in a single zone or vessel or in multiple zones or vessels. The desulfurization zone can be any zone where desulfurizing a sulfur-containing fluid, such as cracked-gasoline or diesel fuel, can take place. The regeneration zone can be any zone where regenerating of a sulfurized sorbent can take place. The activation zone can be any zone wherein reducing (i.e., activating) a regenerated, desulfurized sorbent can take place. Examples of suitable zones are fixed bed reactors, moving bed reactors, fluidized bed reactors, transport reactors, reactor vessels, and the like. When carrying out the process of the present invention in a fixed bed reactor, the steps of desulfurizing, regenerating, and activating can be accomplished in a single zone or vessel. When carrying out the process of the present invention in a fluidized bed reactor system, the steps of desulfurizing, regenerating, and reducing can be accomplished in multiple zones or vessels.

In carrying out the process of the present invention, a stripper zone can optionally be inserted before and/or after, preferably before, regenerating the sulfurized sorbent composition in the regeneration zone. A similar stripper zone, preferably utilizing a stripping agent, serves to remove a portion, preferably all, of any hydrocarbon(s) from the sulfurized sorbent composition. Such stripper zone can also serve to remove oxygen and sulfur dioxide from the system prior to introduction of the regenerated sorbent composition in the activation zone. Preferably, the stripping, when employed is carried out at a total pressure in a range of from about 25 pounds per square inch absolute (psia) to about 500 psia. The temperature for such stripping can be in a range of from about 100° F. to about 1,000° F. Stripping is carried out for a time sufficient to achieve the desired level of stripping. Such stripping can generally be achieved in a time period in a range of from about 0.1 hour to about 4 hours, preferably in a range of from 0.3 hour to 1 hour. The stripping agent is a composition(s) that helps to remove a hydrocarbon(s) from the sulfurized sorbent composition. Preferably, the stripping agent is nitrogen.

Reasonable variations, modifications, and adaptations can be made within the scope of this disclosure and the appended claims without departing from the scope of this invention.

What is claimed is:

1. A sorbent activation process comprising the step of:
   (a) contacting a deactivated sorbent comprising a promoter metal and at least about 2 weight percent sulfur as sulfates with a hydrogen-containing stream in an activation zone under activation conditions sufficient to reduce the valence of said promoter metal and reduce the amount of sulfates associated with said deactivated sorbent, thereby providing an activated sorbent.

2. A sorbent activation process according to claim 1, wherein said promoter metal facilitates the reduction in sulfates so that said activated sorbent comprises less sulfates than if said deactivated sorbent comprised substantially no promoter metal.

3. A sorbent activation process according to claim 2, wherein said promoter metal is selected from the group consisting of nickel, cobalt, iron, manganese, tungsten, silver, gold, copper, platinum, zinc, tin, ruthenium, molybdenum, antimony, vanadium, iridium, chromium, palladium, oxides thereof, precursors to oxides thereof, and combinations thereof.

4. A sorbent activation process according to claim 3, wherein said deactivated sorbent comprises said promoter metal in an amount in a range of from about 1 to about 60 weight percent.

5. A sorbent activation process according to claim 4, wherein said activation conditions include a temperature in a range of from about 100 to about 1500° F., a pressure in a range of from about 10 to about 1500 psig, and an activation residence time in a range of from about 0.1 to about 40 hours.

6. A sorbent activation process according to claim 5, wherein said activated sorbent comprises less than about 2.0 weight percent sulfur as sulfates.

7. A sorbent activation process according to claim 1, wherein said deactivated sorbent comprises at least about 4 weight percent sulfur as sulfates.

8. A sorbent activation process according to claim 7, wherein said metal promoter causes at least about a 2 percent increase in sulfate removal over the amount of sulfates which would have been removed if said deactivated sorbent comprised substantially no promoter metal.

9. A sorbent activation process according to claim 8, wherein said promoter metal is selected from the group consisting of nickel, nickel oxide, nickel oxide precursors, and combinations thereof.

10. A sorbent activation process according to claim 9, wherein said deactivated sorbent comprises said promoter metal in an amount in a range of from about 5 to about 50 weight percent.

11. A sorbent activation process according to claim 10, wherein said activation conditions include a temperature in a range of from about 300 to about 950° F.

12. A sorbent activation process comprising the steps of:
   (a) contacting a sulfurized sorbent comprising zinc sulfide and sulfates with an oxygen-containing stream in a regeneration zone under regeneration conditions sufficient to convert at least a portion of said zinc sulfide to zinc oxide, thereby providing an at least partially regenerated sorbent;
   (b) contacting at least a portion of said at least partially regenerated sorbent with a reducing stream in an activation zone under activation conditions sufficient to reduce the amount of sulfates associated with said at least partially regenerated sorbent, thereby providing an at least partially activated sorbent;
   (c) returning at least a portion of said at least partially activated sorbent to said regeneration zone for contacting with said oxygen-containing stream, thereby providing a further regenerated sorbent; and
   (d) returning at least a portion of said further regenerated sorbent to said activation zone for contacting with said reducing stream, thereby providing a further activated sorbent.

13. A sorbent activation process according to claim 12, wherein said further activated sorbent comprises less sulfates than said at least partially activated sorbent.

14. A sorbent activation process according to claim 13, wherein said sulfurized sorbent comprises at least about 2 weight percent sulfur as sulfates and said further activated sorbent comprises less than about 2 weight percent sulfur as sulfates.

15. A sorbent activation process according to claim 14, wherein steps (c) and (d) cause at least about a 2 percent increase in sulfate removal over the amount of sulfates which would have been removed had steps (c) and (d) not been performed.

16. A sorbent activation process according to claim 15, wherein said sulfurized sorbent comprises a promoter metal selected from the group consisting of nickel, cobalt, iron, manganese, tungsten, silver, gold, copper, platinum, zinc, tin, ruthenium, molybdenum, antimony, vanadium, iridium, chromium, palladium, oxides thereof, precursors to oxides thereof, and combinations thereof, and said sulfurized sorbent comprises said promoter metal in an amount in a range of from about 1 to about 60 weight percent.

17. A sorbent activation process according to claim 16, wherein said activation conditions are sufficient to reduce the valence of said promoter metal.

18. A sorbent activation process according to claim 17, wherein said activation conditions include a temperature in a range of from about 100 to about 1500° F., a pressure in a range of from about 10 to about 1500 psig, and an activation residence time in a range of from about 0.1 to about 40 hours, and said regeneration conditions include a temperature in a range of from about 200 to about 1500° F., a pressure in a range of from about 10 to about 1500 psig, and a regeneration residence time of from about 0.1 to about 40 hours.

19. A sorbent activation process according to claim 18, wherein said metal promoter causes at least about a 2 percent increase in sulfur removal over the amount of sulfates which would have been removed if said sulfurized sorbent comprised substantially no promoter metal.

20. A sorbent activation process according to claim 19, wherein said promoter metal is selected from the group consisting of nickel, nickel oxide, nickel oxide precursors, and combinations thereof.

21. A sorbent activation process comprising the step of:
(a) contacting a deactivated sorbent comprising a promoter metal and at least about 2 weight percent sulfur as sulfates with an hydrogen-containing stream in an activation zone under activation conditions sufficient to reduce the valence of said promoter metal and reduce the amount of sulfates associated with said deactivated sorbent, thereby providing an activated sorbent, said activation conditions including an extended activation residence time of more than about 1 hour.

22. A sorbent activation process according to claim 21, wherein said activation conditions include a temperature in a range of from about 300 to about 950° F.

23. A sorbent activation process according to claim 22, wherein said deactivated sorbent comprises zinc oxide, said promoter metal is selected from the group consisting of nickel, cobalt, iron, manganese, tungsten, silver, gold, copper, platinum, zinc, tin, ruthenium, molybdenum, antimony, vanadium, iridium, chromium, palladium, oxides thereof, precursors to oxides thereof, and combinations thereof, and said deactivated sorbent comprises said promoter metal in an amount in a range of from about 1 to about 60 weight percent.

24. A sorbent activation process according to claim 23, wherein said activation conditions include an extended activation residence time of at least about 2 hours.

25. A sorbent activation process according to claim 24, wherein said activation conditions include an extended activation residence time of at least about 5 hours.

26. A sorbent activation process according to claim 23, wherein said promoter metal is selected from the group consisting of nickel, nickel oxide, nickel oxide precursors, and combinations thereof.

27. A sorbent activation process according to claim 26, wherein said activation conditions include an extended activation residence time of at least about 8 hours.

28. A sorbent activation process according to claim 27, wherein said activation conditions include an extended activation residence time in a range of from 8 to 20 hours.

29. A sorbent activation process according to claim 28, wherein said promoter metal facilitates the reduction in sulfates so that said activated sorbent comprises less sulfates than if said deactivated sorbent comprised substantially no promoter metal.

30. A desulfurization process comprising the steps of:
(a) deactivating a sorbent comprising a promoter metal and zinc sulfide, thereby providing a deactivated sorbent comprising sulfates;
(b) contacting at least a portion of said deactivated sorbent with a hydrogen-containing stream in an activation zone under activation conditions sufficient to reduce the amount of sulfates associated with said deactivated sorbent, thereby providing a reactivated sorbent; and
(c) contacting at least a portion of said reactivated sorbent with a sulfur-containing fluid in a desulfurization zone under desulfurization conditions sufficient to remove at least a portion of the sulfur from the sulfur-containing fluid, thereby providing a desulfurized fluid and a sulfurized sorbent.

31. A desulfurization process according to claim 30 further comprising the step of: (d) prior to step (b), contacting said deactivated sorbent with an oxygen-containing stream in a regeneration zone under regeneration conditions sufficient to convert at least a portion of said zinc sulfide to zinc oxide.

32. A desulfurization process according to claim 31 further comprising the step of: (e) between steps (b) and (c), returning at least a portion of said reactivated sorbent to said regeneration zone.

33. A desulfurization process according to claim 32, wherein said reaction conditions are sufficient to convert at least a portion of said zinc oxide to zinc sulfide with the sulfur removed from said sulfur-containing fluid.

34. A desulfurization process according to claim 33, wherein said promoter metal is selected from the group consisting of nickel, nickel oxide, nickel oxide precursors, and combinations thereof.

35. A desulfurization process according to claim 34, wherein said activation conditions are sufficient to reduce the valence of said promoter metal.

36. A desulfurization process according to claim 35, wherein said sulfur-containing fluid is selected from the group consisting of gasoline, cracked-gasoline, diesel fuel, and combinations thereof.

37. A desulfurization process according to claim 31, wherein step (a) takes place in said regeneration zone.

38. A desulfurization process according to claim 37, wherein said deactivation sorbent comprises at least about 2 weight percent sulfur as sulfates.

39. A desulfurization process according to claim 30, wherein said promoter metal facilitates the reduction in sulfates in step (b) so that said reactivated sorbent comprises less sulfates than if said deactivated sorbent comprised substantially no promoter metal.

40. A desulfurization process according to claim 39, wherein said promoter metal is selected from the group consisting of nickel, cobalt, iron, manganese, tungsten, silver, gold, copper, platinum, zinc, tin, ruthenium, molybdenum, antimony, vanadium, iridium, chromium, palladium, oxides thereof, precursors to oxides thereof, and combinations thereof, and said deactivated sorbent comprises said promoter metal in an amount in a range of from about 5 to about 50 weight percent.

41. A desulfurization process according to claim 40, wherein said promoter metal is selected from the group consisting of nickel, nickel oxide, nickel oxide precursors, and combinations thereof.

42. A desulfurization process according to claim 30, said activation conditions including an extended activation residence time of at least about 5 hours.

* * * * *